United States Patent
Klein (10) Patent No.: US 10,791,093 B2
(45) Date of Patent: Sep. 29, 2020

(54) HOME NETWORK TRAFFIC ISOLATION

(71) Applicant: Avago Technologies General IP (Singapore) Pte. Ltd., Singapore (SG)

(72) Inventor: Philippe Klein, Jerusalem (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 90 days.

(21) Appl. No.: 15/583,891

(22) Filed: May 1, 2017

(65) Prior Publication Data
US 2017/0317981 A1  Nov. 2, 2017

Related U.S. Application Data (60) Provisional application No. 62/329,988, filed on Apr. 29, 2016, provisional application No. 62/333,753, filed on May 9, 2016.

(51) Int. Cl.
| | | |
|---|---|---|
| *H04L 29/06* | (2006.01) | |
| *H04W 12/06* | (2009.01) | |
| *H04W 12/04* | (2009.01) | |
| *H04W 84/12* | (2009.01) | |

(52) U.S. Cl.
CPC ........ *H04L 63/0281* (2013.01); *H04L 63/061* (2013.01); *H04L 63/0876* (2013.01); *H04W 12/04* (2013.01); *H04W 12/06* (2013.01); *H04L 2463/061* (2013.01); *H04W 84/12* (2013.01)

(58) Field of Classification Search
CPC ............. H04L 63/0281; H04L 63/0876; H04L 63/061; H04L 2463/061; H04W 12/06; H04W 12/04; H04W 84/12
See application file for complete search history.

(56) References Cited

U.S. PATENT DOCUMENTS

| | | | | |
|---|---|---|---|---|
| 7,672,459 B2 * | 3/2010 | O'Hara, Jr. | ........... | H04W 12/04 380/278 |
| 8,281,133 B1 * | 10/2012 | Tkal | ...................... | H04L 9/3271 713/171 |
| 8,913,557 B2 * | 12/2014 | Klein | ...................... | H04B 3/50 370/328 |
| 9,166,946 B2 * | 10/2015 | Wang | .................... | H04W 24/08 |

(Continued)

*Primary Examiner* — David Garcia Cervetti
(74) *Attorney, Agent, or Firm* — Morgan, Lewis & Bockius LLP (57) ABSTRACT

Implementations provide for extending an authentication protocol to dynamically create a per user end to end encryption over a multi-hop path for data traffic, which provides an automatic triggering of authentication on each hop of a path when a client joins the network. A device includes a processor that is configured to, in response to receipt of a request for authentication from an end device, perform an authentication protocol to authenticate with an authentication server via an authenticator device. When the authentication protocol is successfully performed, the processor is configured to receive a message indicating that the device was successfully authenticated by the authentication server. The processor is configured to create a pairwise master key (PMK) from the parameters, and derive a pairwise temporary key (PTK) from a key derivation function seeded by the PMK. The processor is configured to encrypt, using the PTK, a message from the end device.

20 Claims, 7 Drawing Sheets

(56) References Cited

U.S. PATENT DOCUMENTS

| | | | |
|---|---|---|---|
| 9,565,558 B2 * | 2/2017 | Radpour | H04L 9/083 |
| 9,674,892 B1 * | 6/2017 | Li | H04W 88/08 |
| 9,832,674 B2 * | 11/2017 | Ghai | H04W 12/04031 |
| 9,894,041 B2 * | 2/2018 | Norum | H04L 63/0428 |
| 2004/0068668 A1 * | 4/2004 | Lor | H04L 63/108 726/15 |
| 2004/0179690 A1 * | 9/2004 | Soliman | H04L 9/12 380/277 |
| 2004/0198220 A1 * | 10/2004 | Whelan | H04W 12/0602 455/41.1 |
| 2005/0102509 A1 * | 5/2005 | Fascenda | H04L 63/062 713/165 |
| 2006/0039563 A1 * | 2/2006 | Carter | H04L 63/083 380/270 |
| 2006/0064588 A1 * | 3/2006 | Tidwell | H04L 41/5067 713/169 |
| 2006/0083377 A1 * | 4/2006 | Ptasinski | H04L 63/0892 380/270 |
| 2006/0101273 A1 * | 5/2006 | Tan | H04L 9/0825 713/182 |
| 2006/0274643 A1 * | 12/2006 | Choyi | H04L 29/12009 370/216 |
| 2007/0016780 A1 * | 1/2007 | Lee | H04W 12/0401 713/171 |
| 2007/0112967 A1 * | 5/2007 | Lee | H04L 63/162 709/229 |
| 2007/0260711 A1 * | 11/2007 | Gupta | H04L 63/0823 709/220 |
| 2007/0275716 A1 * | 11/2007 | Lee | H04L 63/06 455/433 |
| 2008/0065888 A1 * | 3/2008 | Zheng | H04L 9/321 713/171 |
| 2008/0072047 A1 * | 3/2008 | Sarikaya | H04L 63/0869 713/171 |
| 2008/0132279 A1 * | 6/2008 | Blumenthal | H04W 12/06 455/558 |
| 2008/0232382 A1 * | 9/2008 | Iwama | H04L 12/4641 370/401 |
| 2008/0311906 A1 * | 12/2008 | Suh | H04W 12/06 455/435.1 |
| 2009/0007257 A1 * | 1/2009 | Hirata | G06F 21/32 726/19 |
| 2009/0063851 A1 * | 3/2009 | Nijdam | H04L 63/064 713/155 |
| 2009/0067441 A1 * | 3/2009 | Ansari | H04L 12/2814 370/401 |
| 2009/0217033 A1 * | 8/2009 | Costa | H04W 12/0602 713/155 |
| 2009/0222902 A1 * | 9/2009 | Bender | H04L 63/0823 726/10 |
| 2009/0287922 A1 * | 11/2009 | Herwono | H04L 9/0822 713/155 |
| 2009/0307496 A1 * | 12/2009 | Hahn | H04L 63/0428 713/171 |
| 2010/0199094 A1 * | 8/2010 | Ho | H04L 9/0844 713/171 |
| 2010/0220856 A1 * | 9/2010 | Kruys | H04L 9/0833 380/44 |
| 2010/0228980 A1 * | 9/2010 | Falk | H04L 63/062 713/171 |
| 2011/0010539 A1 * | 1/2011 | Salomone | H04L 9/321 713/155 |
| 2011/0274029 A1 * | 11/2011 | Connelly | H04W 12/003 370/315 |
| 2012/0254615 A1 * | 10/2012 | Ma | H04W 12/0401 713/171 |
| 2013/0036305 A1 * | 2/2013 | Yadav | H04W 12/04033 713/168 |
| 2013/0095789 A1 * | 4/2013 | Keevill | H04W 12/0609 455/411 |
| 2013/0145149 A1 * | 6/2013 | Tanaka | H04L 9/0838 713/155 |
| 2013/0212394 A1 * | 8/2013 | Chai | H04W 12/0608 713/171 |
| 2013/0247150 A1 * | 9/2013 | Cherian | H04L 63/0815 726/4 |
| 2013/0263223 A1 * | 10/2013 | Cherian | H04W 12/04 726/4 |
| 2013/0305332 A1 * | 11/2013 | Narasimhan | H04W 12/04 726/7 |
| 2013/0315393 A1 * | 11/2013 | Wang | H04W 12/04 380/270 |
| 2014/0040422 A1 * | 2/2014 | Jaggi | H04L 63/062 709/217 |
| 2014/0050320 A1 * | 2/2014 | Choyi | H04L 63/08 380/270 |
| 2014/0112301 A1 * | 4/2014 | Shu | H04W 8/245 370/329 |
| 2014/0146735 A1 * | 5/2014 | Poola | H04L 12/2863 370/312 |
| 2014/0281541 A1 * | 9/2014 | Cherian | H04L 63/06 713/169 |
| 2014/0355763 A1 * | 12/2014 | Lee | G06F 13/10 380/282 |
| 2015/0040195 A1 * | 2/2015 | Park | H04W 12/08 370/338 |
| 2015/0237519 A1 * | 8/2015 | Ghai | H04W 12/04031 380/270 |
| 2015/0244723 A1 * | 8/2015 | Fan | H04W 48/18 713/171 |
| 2015/0281194 A1 * | 10/2015 | Elliott | H04L 63/08 726/7 |
| 2015/0334571 A1 * | 11/2015 | Xu | H04W 12/04 455/410 |
| 2015/0359017 A1 * | 12/2015 | Xue | H04W 12/06 370/338 |
| 2015/0381611 A1 * | 12/2015 | Mestanov | H04L 63/0853 726/6 |
| 2016/0112869 A1 * | 4/2016 | Lee | H04W 12/06 713/171 |
| 2016/0127903 A1 * | 5/2016 | Lee | H04W 84/12 713/171 |
| 2016/0135045 A1 * | 5/2016 | Lee | H04W 12/06 726/9 |
| 2016/0150412 A1 * | 5/2016 | Liu | G06K 9/00449 370/338 |
| 2016/0165410 A1 * | 6/2016 | Purohit | H04W 4/08 370/311 |
| 2016/0205555 A1 * | 7/2016 | Agiwal | H04W 12/0401 713/168 |
| 2016/0227443 A1 * | 8/2016 | Tomici | H04W 12/06 |
| 2016/0277929 A1 * | 9/2016 | Liu | H04L 67/16 |
| 2016/0295364 A1 * | 10/2016 | Zakaria | H04W 4/023 |
| 2016/0295409 A1 * | 10/2016 | Lee | H04W 12/06 |
| 2016/0295413 A1 * | 10/2016 | Liu | G06K 9/00449 |
| 2016/0360404 A1 * | 12/2016 | Benoit | H04L 63/062 |
| 2016/0374118 A1 * | 12/2016 | Mestanov | H04L 63/205 |
| 2017/0034864 A1 * | 2/2017 | Kawakami | H04W 84/10 |
| 2017/0054694 A1 * | 2/2017 | Fujikami | H04L 9/0863 |
| 2017/0070881 A1 * | 3/2017 | Sun | H04L 63/06 |
| 2017/0134940 A1 * | 5/2017 | Sharma | H04L 67/2842 |
| 2017/0134947 A1 * | 5/2017 | Nilsson | H04W 12/06 |
| 2017/0195318 A1 * | 7/2017 | Liu | H04W 12/06 |
| 2017/0230824 A1 * | 8/2017 | Li | H04W 12/04 |
| 2017/0245143 A1 * | 8/2017 | Lindheimer | H04W 8/26 |
| 2017/0265070 A1 * | 9/2017 | Patel | H04W 12/0602 |
| 2017/0272368 A1 * | 9/2017 | Mestanov | H04W 12/08 |
| 2017/0272433 A1 * | 9/2017 | Jaggi | H04W 12/06 |
| 2017/0289159 A1 * | 10/2017 | Adrangi | H04W 12/08 |
| 2017/0310655 A1 * | 10/2017 | Sethi | H04L 12/4633 |
| 2017/0331688 A1 * | 11/2017 | Mestanov | H04W 88/06 |
| 2017/0332430 A1 * | 11/2017 | Ponnuswamy | H04W 4/80 |
| 2018/0227758 A1 * | 8/2018 | Varon | H04W 12/06 |

* cited by examiner

HOME NETWORK TRAFFIC ISOLATION

CROSS-REFERENCE TO RELATED APPLICATIONS

The present application claims the benefit of U.S. Provisional Patent Application Ser. No. 62/329,988, entitled "Home Network Traffic Isolation," filed Apr. 29, 2016, and the benefit of U.S. Provisional Patent Application Ser. No. 62/333,753, entitled "Home Network Traffic Isolation," filed May 9, 2016, both of which are hereby incorporated herein by reference in their entireties and made part of the present U.S. Utility patent application for all purposes.

BACKGROUND

When a user's home network access point is configured for use with community Wi-Fi (e.g., as a public hotspot), data traffic from different public users, as well as data traffic of the user, may be transported over the home network backbone between the user's home network access point and the residential gateway.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A service provider can provide Wi-Fi network access, using existing Wi-Fi infrastructure, to roaming subscriber devices via a community network. Access to the community network may be provided through a residential gateway inside a residential subscriber's home. In an example, a residential gateway may provide the functionality of an access point, modem, and/or router. One of the functionalities of a residential gateway may be to provide access to a wireless local area network (WLAN), for example, based on the IEEE 802.11 standard family (e.g., "Wi-Fi"). The residential gateway can connect the WLAN to a WAN (wide area network) or the Internet (e.g., a network of networks).

A residential gateway in a home may provide a private Wi-Fi network for the home owner/subscriber, and a community Wi-Fi network (e.g., public Wi-Fi network) for roaming subscribers that are currently in the area. As an illustration, while the Wi-Fi enabled device(s) of the home subscriber or user are within the range of the user's private Wi-Fi network, the user's Wi-Fi enabled device(s) can connect to the private network. When the Wi-Fi enabled device(s) of the user are outside of the wireless coverage area of the residential gateway, and enter into the range of another residential gateway operated by the same service provider (that supports community Wi-Fi), the user's Wi-Fi enabled device(s) can connect to the public community Wi-Fi network provided by the other residential gateway.

To ensure privacy and security, data traffic on the community Wi-Fi network may be isolated from data traffic on the private network of the home user. In this manner, a device on the public network will not have access to any other device or traffic on the public or private network. A device on the private network does not have access to the traffic or devices on the public network. In an example, data traffic on the public network may travel through a secure tunnel through the residential gateway before being routed to the Internet, ensuring that the traffic is separated between the private and public networks. The private network of the home user may also be further divided into networks for different classes of users. For example, there could be a separate Wi-Fi network(s) for children or guests, etc. Traffic isolation, in some instances, may not be limited to home Wi-Fi users. Services related to home automation, home security, and/or e-health may also have their traffic isolated.

To extend the range of the Wi-Fi network provided by the residential gateway, one approach involves using one or more Wi-Fi extenders that connect to the residential gateway. In some instances, the residential gateway is not placed in an area in the home that provides the optimal wireless coverage. For example, a home owner could place the residential gateway in the basement, a closet, or some other hidden or remote location inside the house, which may reduce the area of wireless coverage as physical barriers (e.g., walls, objects, floors, etc.) attenuate the transmission of wireless signals. In another instance, the wireless capabilities of the residential gateway are not provided or deactivated. The Wi-Fi extender in at least this instance may perform the function of a wireless access point allowing clients to connect to the community Wi-Fi network. In such a configuration, the traffic of each community Wi-Fi user goes through a LAN transport to the residential gateway. Thus, the traffic of each user needs to be isolated over the trunk between the Wi-Fi extender and the residential gateway.

For explanatory purposes, the subject system is discussed herein with respect to community networks established over Wi-Fi. However, the subject system may also be applicable to community networks established over a cellular network, such as via one or more pico cells, femto cells, or generally any cellular base stations that may be implemented in user's home network.

Figure 1:
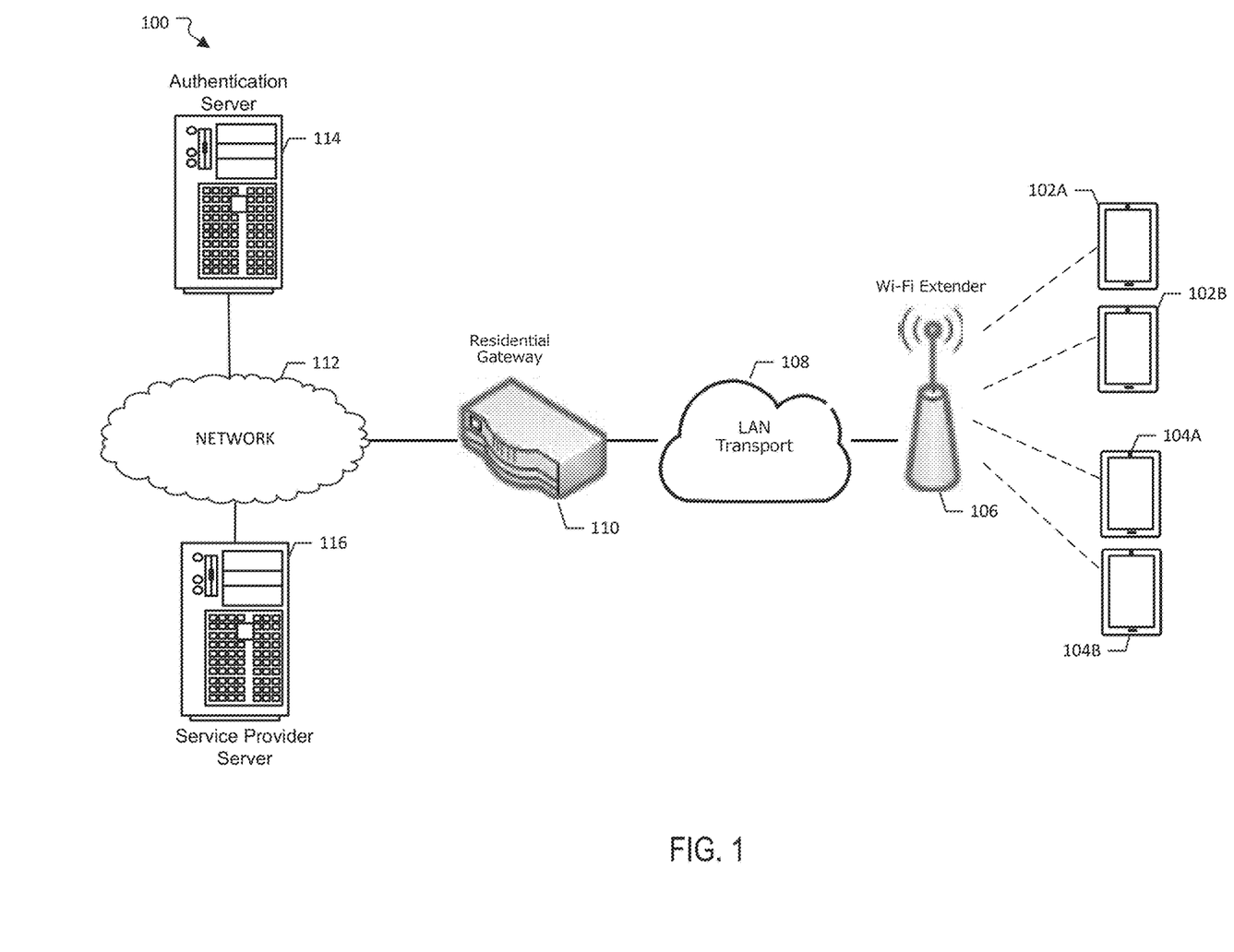
FIG. 1 illustrates an example network environment in which home network traffic isolation can be implemented in accordance with one or more implementations.

FIG. 1 illustrates an example network environment 100 in which home network traffic isolation can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more end devices 102A-B, 104A-B, a Wi-Fi extender device 106, a local area network (LAN) transport 108, a residential gateway device 110, an external network 112, an authentication server 114, and a service provider server 116. The LAN transport 108 and/or the external network 112 may include one or more network transmission media and may also include one or more devices, such as switches, routers, etc., that facilitate wireless and/or wire line transmissions of the end devices 102A-B, 104A-B. The one or more network transmission media may include one or more of a coaxial transmission medium, an Ethernet transmission medium, a power line transmission medium, etc. Each of the end devices 102A-B, 104A-B may be any appropriate type of computing device, electronic device, and/or network device.

The end devices 102A-B, 104A-B can be any devices that can communicate wirelessly with the Wi-Fi extender device 106. The Wi-Fi extender device 106 may be communicatively coupled to the end devices 102A-B, 104A-B via a first network connections that utilize a first networking technology, such as Wi-Fi, and the Wi-Fi extender device 106 may be communicatively coupled to the LAN transport 108 via a separate second network connection that utilizes a second networking technology, such as Ethernet, coaxial networking (e.g., MoCA), a power-line networking (e.g., HomePlug AV), etc. The Wi-Fi extender device 106 can then facilitate transmissions between end devices 102A-B, 104A-B and the residential gateway device 110 over the LAN transport 108. The Wi-Fi extender device 106 may provide the same or similar functionality as an access point and be communicatively coupled to other access points. In one or more implementations, the Wi-Fi extender device 106 may be referred to as a bridge device or a network bridge device.

The residential gateway device 110 may be communicatively coupled to an external network 112, e.g. external to the LAN transport 108. The external network 112 may provide, for example, an uplink to a headend device and/or an uplink to the Internet. Further, a service provider server 116 coupled to the external network 112 coordinates/provides a community network service for one or more end devices in accordance with at least an embodiment described herein. Further, as illustrated, the authentication server 114 may be communicatively coupled to the external network 112 and/or the residential gateway device 110. The authentication server 114, in one example, provides authentication, authorization, and accounting (AAA or Triple A) management for any of the end devices 102A-B that connect and use the community network service (e.g., provided by the service provider server 116).

The Wi-Fi extender device 106 may, for example, be in a dwelling unit of a user, such as a user's house, in an office building, in a hotel, in a restaurant, or generally in any location. The Wi-Fi extender device 106 may be used by the end devices 104A-B of the user to access the external network 112, e.g. via the LAN transport 108 and the residential gateway device 110. The Wi-Fi extender device 106 may be, and/or may be communicatively coupled to, another Wi-Fi extender. The Wi-Fi extender device 106 may be configured to allow end devices 102A-B of other users, e.g. outside of the user's dwelling unit or house, to connect and access the external network 112 via the LAN transport 108 and the residential gateway device 110. The end devices 102A-B of the other users may authenticate with the authentication server 114 prior to being provided access to the external network 112 via the residential gateway device 110 and the LAN transport 108.

Since the end devices 102A-B are associated with one or more other users than the end devices 104A-B, the data traffic of the end devices 102A-B, 104A-B through LAN transport 108 and to the residential gateway device 110 should be isolated from one another, e.g. to ensure privacy of the users' data. Such isolation can be achieved by layer 2 per traffic encryption of each individual user's traffic. However, independent layer 2 per traffic encryption of each individual user's traffic at each hop in the network environment 100 may be unwieldy and difficult to manage. Accordingly, the subject system provides end-to-end layer 2 authentication of each individual user's traffic.

In the subject system, layer 2 (L2) authentication, such as Extensible Authentication Protocol (EAP) over LAN (EAPoL), is used to ensure that the traffic of the end devices 102A-B, 104A-B is isolated from one another. The layer 2 authentication may be cascaded such that the Wi-Fi extender device 106, initially triggered by one of the end devices 102A-B, 104A-B, then commences its own authentication with the authentication server 114 before acting as a proxy to the EAP authentication of the one of the end devices 102A-B, 104A-B. Additionally, as described further herein, at least one embodiment provides a cascaded layer 2 authentication such that the Wi-Fi extender device 106 and the residential gateway device 110 derive the same temporary master key as part of the authentication protocol based on a successful authentication of the Wi-Fi extender device 106. In this manner, the Wi-Fi extender device 106 and the residential gateway device 110 can each independently derive the same key without needing to jointly establish the key. Examples of layer 2 authentication in the subject system are discussed further herein. Although the subject system is described in the context of a wireless and wired network, the subject system can be extended to any type of multi-hop paths up to and including another network.

In an example, traffic isolation between users may require each user device (e.g. end devices 102A-B, 104A-3B) to be authenticated and encrypt with pairwise keys (e.g., key(s) shared between two devices, one of which might be the Wi-Fi extender device 106, a Wi-Fi extender, or the residential gateway device 110). Such pairwise keys may need to be created dynamically when an end device 102A (e.g., a device connecting to the Wi-Fi extender device 106) joins the network, which utilizes system resources and may increase network latency. Further, a delay in creating a new pairwise key during the initial authentication for the end device 102A may be too great for an acceptable level of service, especially for implementations that provide wireless fast roaming (e.g., IEEE 802.11r or Fast BSS Transition) and require lower network latency and substantially seamless access.

In one previous approach, the Wi-Fi extender device 106 would be authenticated by itself (e.g., before any end device connects to the Wi-Fi extender device 106) that would provide a trunk over a single link but would be reliant on the quality of the trunk. Implementations of the subject technology provide for extending a standard protocol (e.g., the 802.11i security protocol) to dynamically create an end to end encryption over a multi-hop path (e.g., from a given end device over one or more intermediate devices to the residential gateway device 110), which provides for an automatic triggering of authentication on each hop of the path when an end device joins the network.

Since many wireless devices support the 802.11i security protocol, implementations of the subject technology provide for extending the protocol without installing new software and/or modifying firmware for existing wireless devices. As a result, these existing wireless devices are compatible with implementations of the subject technology described herein. More specifically, the Wi-Fi extender device 106 in at least one implementation acts as a supplicant that is authenticated and then shares a pairwise master key (PMK) with its authenticators. An authenticated Wi-Fi extender device 106 then acts as authenticator to one or more end devices 102A-B, 104A-B. When triggered by a supplicant authentication request from an end device 102A, an authenticated Wi-Fi extender device 106 performs a handshake procedure with an authenticator (e.g., a residential gateway device 110) to derive a pairwise transient key (PTK). The authenticated Wi-Fi extender device 106 can act as proxy to EAP authentication of the supplicant end device 102A. In one or more implementations, a supplicant may refer to a device, in a network environment, that seeks authentication by an authenticator, for example, to access network resources secured by the authentication mechanism (e.g., IEEE 802.1X).

Figure 2:
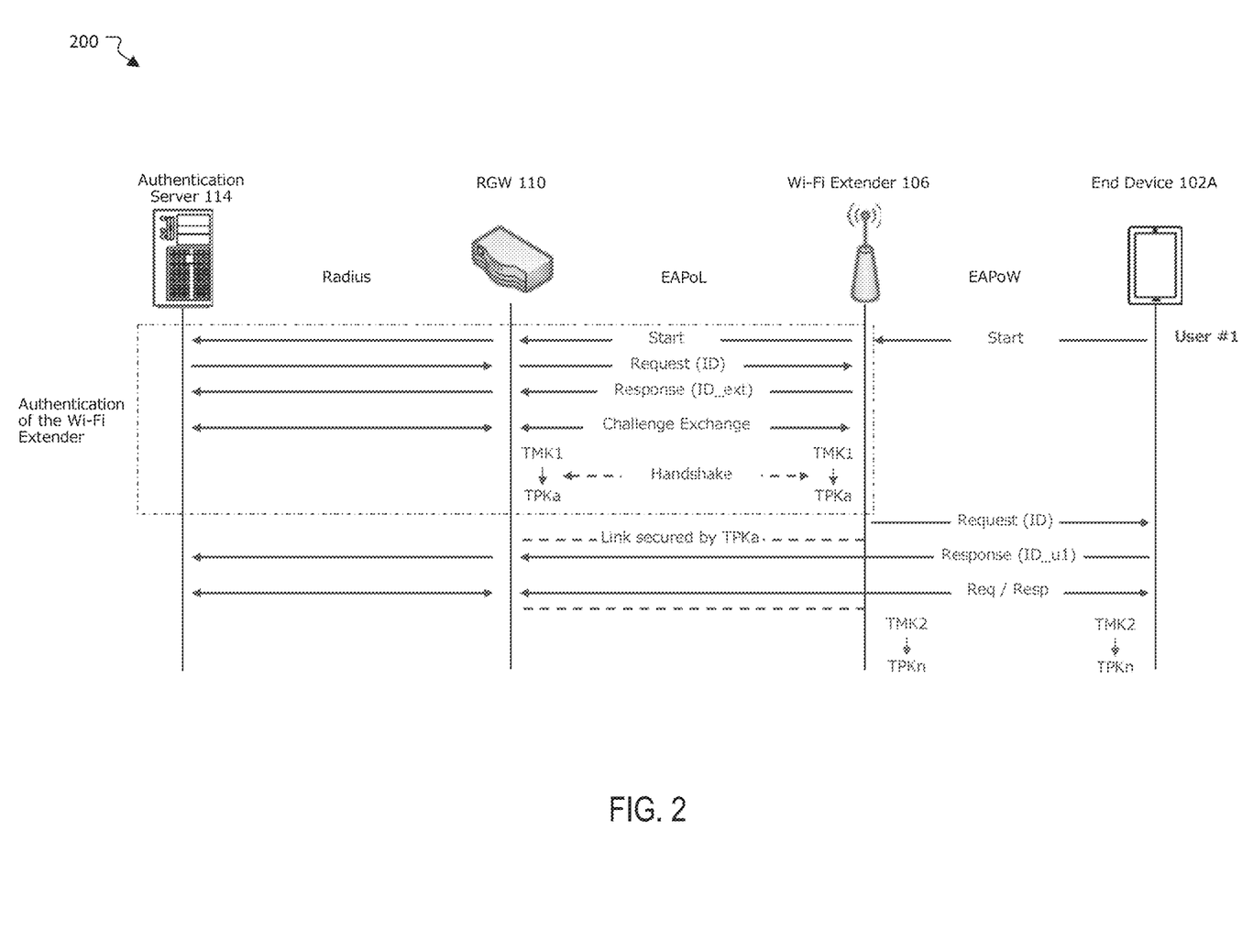
FIG. 2 illustrates an example communication flow for providing cascaded authentication of a supplicant end device using a first authentication protocol in accordance with one or more implementations.

FIG. 2 illustrates an example communication flow 200 for providing cascaded authentication of a supplicant end device 102A using an Extensible Authentication Protocol (EAP) over LAN (EAPoL). Further, not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. The following discussion of FIG. 2 below will refer to devices described by reference to FIG. 1.

In an example, an Extensible Authentication Protocol (EAP) over Wireless (EAPoW) is used to authenticate the end device 102A to allow access to a community network service provided by the service provider server 116. Although EAPoL and EAPoW are mentioned, it is understood that EAPoL and EAPoW are substantially the same protocol, and the only difference is the type of datagram used as containers for EAP messages (e.g., Ethernet frames for EAPoL and IEEE 802.11 frames for EAPoW). In accordance with EAP, the end device 102A sends an associate request message (e.g., 802.1X associate request) to the Wi-Fi extender device 106 to initiate a connection with the Wi-Fi extender device 106. The Wi-Fi extender device 106 detects the end device 102A and enables a port associated with the end device 102A to enable a connection with the end device 102A, and sets the port state as being unauthorized (e.g., not authenticated). In this unauthorized state, data traffic from the end device 102A, except for 802.1X messages related to the authentication of the end device 102A, may be blocked. The Wi-Fi extender device 106 sends an associate response message (e.g., 802.1X associate response message) to the end device 102A to indicate to the end device 102A to commence an EAP authentication procedure.

As illustrated, the end device 102A sends an EAP start message to the Wi-Fi extender device 106 to access a Wi-Fi network provided by the Wi-Fi extender device 106, such as a Wi-Fi network that is provided as part of a community network service.

Starting at the Wi-Fi extender device 106, EAPoL may be used to authenticate the Wi-Fi extender device 106, such as with the residential gateway device 110. The Wi-Fi extender device 106, acting as a supplicant (e.g., an entity seeking authentication), sends an EAP start message to the residential gateway device 110 that acts an authenticator and proxy to the authentication server 114. Remote Authentication Dial-In User Service (RADIUS) is a networking protocol that provides centralized authentication, authorization, and accounting (AAA or Triple A) management for user devices that connect and use a network service. Although RADIUS is mentioned, it is appreciated that other types of protocols may be utilized such as Diameter. The example in FIG. 2 includes the authentication server 114 that provides AAA services in accordance with RADIUS; however, the authentication server 114 is not limited to RADIUS and the authentication server 114 can implement any authentication mechanism/networking protocol. In an example, the residential gateway device 110 converts the EAP start message into another message in an appropriate format (e.g., RADIUS or Diameter) for sending to the authentication server 114. In another example, the residential gateway device 110 sends a message to connect to the authentication server 114 and/or initiate a session for authentication with the authentication server 114. The authentication server 114 can send a message to the residential gateway device 110 to confirm the connection and/or to confirm that the session for authentication has been initiated.

After receiving the EAP start message, the residential gateway device 110 can send an EAP request ID message to the Wi-Fi extender device 106. In response to the EAP request ID message, the Wi-Fi extender device 106 sends its identity in an EAP response ID message to the residential gateway device 110. The identity may be a user ID associated with a user of the extender device (e.g., an administrator user account) in an example. In another example, the identity may be determined using a Challenge-Handshake Authentication Protocol (CHAP) in which the identity is based on a value determined by using a hash function. Other types of EAP methods may be used and still be within the scope of the subject technology such as username/password, certificate, biometric, SIM, etc.

The residential gateway device 110, acting as the proxy to the authentication server 114, converts the EAP response ID message into another message in an appropriate format (e.g., RADIUS or Diameter) for sending to the authentication server 114. In an example, the residential gateway device 110 can send a RADIUS access request message to the authentication server 114. The RADIUS access request message may include the EAP response ID message and/or an attribute corresponding to the identity of the Wi-Fi extender device 106 and/or other attributes. Although RADIUS messages are mentioned in the example of FIG. 2, as discussed before, other protocols may be used by the authentication server 114 such as Diameter.

A challenge exchange as illustrated in FIG. 2 may then be initiated. After receiving the RADIUS access request message (or other indication that the Wi-Fi extender device 106 is to be authenticated), the authentication server 114 sends a RADIUS access challenge message to the residential gateway device 110. In an example, the RADIUS access challenge message includes the identity of the Wi-Fi extender device 106 and/or other attributes. The RADIUS access challenge message may include an EAP request message specifying a type of EAP based authentication for a supplicant (e.g., the Wi-Fi extender device 106) to perform. The type of EAP authentication method could be based on Protected Extensible Authentication Protocol (Protected EAP or "PEAP") or another appropriate authentication method in an example.

After receiving the RADIUS access challenge message, the residential gateway device 110 determines, based on the included identity of the Wi-Fi extender device 106 and/or the attributes, that the authentication server 114 has initiated the challenge exchange with the Wi-Fi extender device 106. The residential gateway device 110 sends an EAP request message (which can be based on the EAP request message included in the RADIUS access challenge message) to the Wi-Fi extender device 106.

After receiving the EAP request message, the Wi-Fi extender device 106 can respond by sending authentication credentials (e.g., based on a secret master key) in an EAP response message to the residential gateway device 110. The authentication credentials may be encrypted in an example. The residential gateway device 110 then converts the EAP response message into another message in an appropriate format (e.g., RADIUS or Diameter) for sending to the authentication server 114.

The authentication server 114 can authenticate the Wi-Fi extender device 106 using an appropriate authentication algorithm (e.g., PEAP). In an example, if the authentication server 114 authenticates the Wi-Fi extender device 106 based at least in part on the authentication credentials of the Wi-Fi extender device 106, a RADIUS access accept message may be sent by the authentication server 114 to the residential gateway device 110. In response to receiving the access accept message, the residential gateway device 110, in an example, then sends an EAP success message to the Wi-Fi extender device 106.

After the Wi-Fi extender device 106 has been successfully authenticated, a shared secret key called the Pairwise Master Key (PMK) "TMK1" is generated. In an example, the PMK is derived from one or more EAP parameters provided by the authentication server 114 (e.g., included in the RADIUS access accept message discussed before). In an example, the one or more EAP parameters may include EAP keying information such as a master session key, extended master session key and/or an initialization vector. The residential gateway device 110 may determine the PMK using one or more EAP parameters. The same PMK may be determined, separately, by the Wi-Fi extender device 106 using one or more EAP parameters received during the progression of the authentication communication flow discussed before (e.g., parameters forwarded from the authentication server 114 or the residential gateway device 110).

A handshake procedure may be initiated between the residential gateway device 110 and the Wi-Fi extender device 106 to generate another key called a Pairwise Transient Key (PTK) "TPKa". More specifically, the authenticated Wi-Fi extender device 106 initiates a handshake with the residential gateway device 110 to determine the PTK. The handshake, in an example, may be implemented using a four-way handshake technique. Instead of disclosing the PMK key, the residential gateway device 110 and the Wi-Fi extender device 106 can each encrypt respective messages to each other, which can be decrypted using the PMK that is already shared. If decryption of the messages is successful (e.g., the decrypted messages match each other), then the handshake procedure between the authenticated Wi-Fi extender device 106 and the residential gateway device 110 is considered successful. In an example, the encrypted message may include information based at least in part on a shared secret master key.

In one or more implementations, the PTK is then generated by concatenating one or more of the following attributes: PMK, AP nonce (ANonce), STA nonce (SNonce), AP MAC address, and STA MAC address. Further, the concatenated attributes may then be put through a pseudo random function to generate the PTK. In an example, the PTK may be derived from a key derivation function seeded by the PMK. A secured link, based on the generated PTK, is then established between the Wi-Fi extender device 106 and residential gateway device 110. The secured link, in an example, is an appropriate secure tunnel (e.g., IPSec). The generated PTK, in an example, is utilized to encrypt data traffic from the Wi-Fi extender device 106 to the residential gateway device 110. In an example, the Wi-Fi extender device 106 may encrypt, using the PTK, messages received from the end device 102A, as part of the authentication protocol, to send to the residential gateway device 110.

The Wi-Fi extender device 106 then sends an EAP request ID message to the end device 102A. The end device 102A may send a response that includes its identity in an EAP response ID message through the secured link to the residential gateway device 110. The identity may be a user ID or based on information from a shared secret master key associated with a user of the end device 102A in an example. In an example, the EAP request ID message is sent to the Wi-Fi extender device 106, which acts as an authenticator and proxy for authenticating the end device 102A, and is forwarded through the secured link to the residential gateway device 110. The residential gateway device 110, acting as the proxy to the authentication server 114, converts the EAP response ID message into another message in an appropriate format (e.g., RADIUS or Diameter) and sends this message to the authentication server 114. In an example, the residential gateway device 110 can send a RADIUS access request message to the authentication server 114. The RADIUS access request message may include the EAP response ID message and/or an attribute corresponding to the identity of the end device 102A and/or other attributes.

In an example, the authentication server 114 can initiate another challenge exchange with respect to the end device 102A, which is similar to the challenge exchange as discussed before with respect to the Wi-Fi extender device 106. For example, the authentication server 114 sends the EAP request message to the residential gateway device 110, which forwards this message to the Wi-Fi extender device 106. The Wi-Fi extender device 106 forwards the EAP request message from the authentication server 114 to the end device 102A. In response, the end device 102A sends authentication credentials such as a user ID or information based on a shared secret master key (either of which may be encrypted) in an EAP response message to the Wi-Fi extender device 106, which is forwarded to the residential gateway device 110. The residential gateway device 110 then converts the EAP response message into another message in an appropriate format (e.g., RADIUS or Diameter) and sends this message to the authentication server 114.

The authentication server 114 can authenticate the end device 102A using an appropriate authentication algorithm (e.g., PEAP). If the authentication server 114 successfully authenticates the end device 102A based at least in part on the authentication credentials of the end device 102A, a RADIUS access accept message may be sent by the authentication server 114 to the residential gateway device 110. In response to receiving the RADIUS access accept message, the residential gateway device 110, in an example, then sends an EAP success message to the end device 102A using the secured link. The port associated with the end device 102A may then be set to an authorized state by the Wi-Fi extender device 106, allowing all data traffic from the end device 102A to the Wi-Fi extender device 106.

After the end device 102A has been successfully authenticated, a second shared secret key PMK "TMK2" is generated. In an example, the second PMK is derived from one or more EAP parameters provided by the authentication server 114 (e.g., included in the RADIUS access accept message discussed before). In an example, the one or more EAP parameters may include EAP keying information such as a master session key, extended master session key and/or an initialization vector. The Wi-Fi extender device 106 may determine the second PMK using one or more EAP parameters. The same second PMK may be determined, separately, by the end device 102A using one or more EAP parameters received during the progression of the authentication communication flow discussed before (e.g., parameters forwarded from the authentication server 114 or the residential gateway device 110).

A handshake procedure is initiated between the Wi-Fi extender device 106 and the end device 102A to generate a second key PTK "TPKn". More specifically, the authenticated Wi-Fi extender device 106 performs a handshake with the end device 102A to determine the second PTK. As mentioned above, the handshake may be implemented using a four-way handshake technique. Instead of disclosing the second PMK key, the Wi-Fi extender device 106 and the end device 102A can each encrypt respective messages to each other, which can be decrypted using the second PMK. If decryption of the messages is successful (e.g., the decrypted messages match each other), then the handshake procedure between the Wi-Fi extender device 106 and the end device 102A is considered successful. In an example, the encrypted message may include information based on a shared secret master key. In one or more implementations, the second PTK is then generated by concatenating one or more of the following attributes: second PMK, AP nonce (ANonce), STA nonce (SNonce), AP MAC address, and STA MAC address. Further, the concatenated attributes may then be put through a pseudo random function to generate the second PTK. In an example, the second PTK may be derived from a key derivation function seeded by the PMK. The generated second PTK, in an example, is utilized to encrypt data traffic from the end device 102A to the Wi-Fi extender device 106 and/or the residential gateway device 110.

Figure 3:
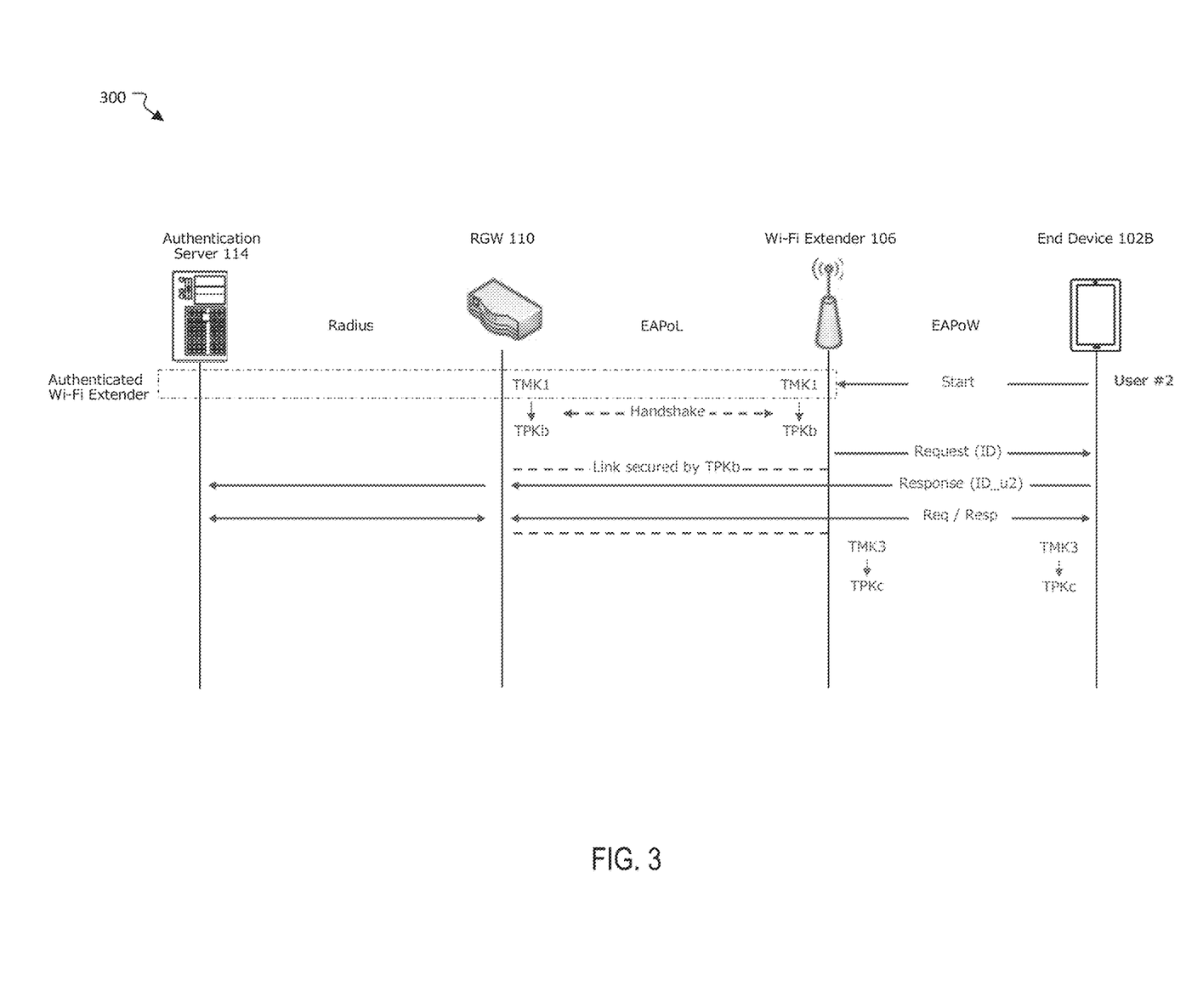
FIG. 3 illustrates an example communication flow for providing an EAPoL cascaded authentication of a supplicant end device after a Wi-Fi extender has been authenticated by an authentication server on a given network in accordance with one or more implementations.

FIG. 3 illustrates an example communication flow 300 for providing cascaded authentication of a supplicant end device, using an authentication protocol, after a Wi-Fi extender has been authenticated by an authentication server on a given network (e.g., as described above by reference to FIG. 2). In an example, the authentication protocol is an Extensible Authentication Protocol (EAP) over LAN (EAPoL). Further, not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. The following discussion of FIG. 3 will refer to devices described by reference to FIG. 1.

In an example, an Extensible Authentication Protocol (EAP) over Wireless (EAPoW) is used to authenticate (which is considered substantially the same protocol as EAPoL as discussed above by reference to the description in FIG. 2) the end device 102B to access a community network service provided by the service provider server 116. In accordance with EAP, the end device 102B sends an associate request message (e.g., 802.1X associate request) to the Wi-Fi extender device 106 to initiate a connection with the Wi-Fi extender device 106. The Wi-Fi extender device 106 detects the end device 102B and enables a port associated with the end device 102B to enable a connection with the end device 102B, and sets the port state as being unauthorized (e.g., not authenticated). In this unauthorized state, data traffic from the end device 102B, except for 802.1X messages related to the authentication of the end device 102B, may be blocked. The Wi-Fi extender device 106 sends an associate response message (e.g., 802.1X associate response message) to the end device 102B to indicate to the end device 102B to commence an EAP authentication procedure. As illustrated, the end device 102B sends an EAP start message to an Wi-Fi extender device 106, which has already been authenticated, to commence the EAP authentication procedure to access a community network service provided by the service provider server 116.

In the example of FIG. 3, the PMK has already been generated before the end device 102B requests access to the network. Similar to the discussion by reference to FIG. 2, after the Wi-Fi extender device 106 was authenticated, a shared secret key called the PMK "TMK1" was generated.

As the end device 102B is a new device that requests access to the network, a handshake procedure is initiated between the residential gateway device 110 and the Wi-Fi extender device 106 to generate another key called a Pairwise Transient Key (PTK) "TPKb". The handshake, in an example, may be implemented using a four-way handshake technique, although it is appreciated that other handshake techniques may be utilized. Instead of disclosing the PMK key, the residential gateway device 110 and the Wi-Fi extender device 106 can each encrypt respective messages to each other, which can be decrypted using the PMK that is already shared. If decryption of the messages is successful (e.g., the decrypted messages match each other), then the handshake procedure between the authenticated Wi-Fi extender device 106 and the residential gateway device 110 is considered successful. In an example, the encrypted message may include information based on a shared secret master key. Thus, the same PMK key may be used to generate multiple different PTKs for different ends devices that connect to the network.

In one or more implementations, the PTK is then generated by concatenating one or more of the following attributes: PMK, AP nonce (ANonce), STA nonce (SNonce), AP MAC address, and STA MAC address. Further, the concatenated attributes may then be put through a pseudo random function to generate the PTK. A secured link, based on the generated PTK, is then established between the Wi-Fi extender device 106 and residential gateway device 110. The secured link, in an example, is an appropriate secure tunnel (e.g., IPSec). The generated PTK, in an example, is utilized to encrypt data traffic from the Wi-Fi extender device 106 to the residential gateway device 110.

The Wi-Fi extender device 106 then sends an EAP request ID message to the end device 102B. The end device 102B may send a response that includes its identity (e.g., a user ID and/or password associated with the end device 102B) in an EAP response ID message through the secured link to the residential gateway device 110. In an example, the EAP request ID message is sent to the Wi-Fi extender device 106, which acts as an authenticator and proxy for authenticating the end device 102B, and is forwarded through the secured link to the residential gateway device 110.

The residential gateway device 110, acting as the proxy to the authentication server 114, converts the EAP response ID message into another message in an appropriate format (e.g., RADIUS or Diameter) for sending to the authentication server 114. In an example, the residential gateway device 110 can send a RADIUS access request message to the authentication server 114. The RADIUS access request message may include the EAP response ID message and/or an attribute corresponding to the identity of the end device 102B and/or other attributes, authentication server 114

In an example, the authentication server 114 can initiate another challenge exchange with respect to the end device 102B, which is similar to the challenge exchange as discussed before with respect to the Wi-Fi extender device 106 by reference to FIG. 2. For example, the authentication server 114 sends the EAP request message to the residential gateway device 110, which forwards this message to the Wi-Fi extender device 106. The Wi-Fi extender device 106 forwards the EAP request message from the authentication server 114 to the end device 102B. In response, the end device 102B sends authentication credentials such as a user ID or information based on a shared secret master key (either of which may be encrypted) in an EAP response message to the Wi-Fi extender device 106, which is forwarded to the residential gateway device 110. The residential gateway device 110 then converts the EAP response message into another message in an appropriate format (e.g., RADIUS or Diameter) for sending to the authentication server 114.

The authentication server 114 can authenticate the end device 102B using an appropriate authentication algorithm (e.g., PEAP). If the authentication server 114 authenticates the end device 102B based at least in part on the authentication credentials of the end device 102B, a RADIUS access accept message may be sent by the authentication server 114 to the residential gateway device 110. In response to receiving the RADIUS access accept message, the residential gateway device 110, in an example, then sends an EAP success message to the end device 102B using the secured link. The port associated with the end device 102B may then be set to an authorized state by the Wi-Fi extender device 106, allowing all data traffic from the end device 102B to the Wi-Fi extender device 106.

After the end device 102B has been successfully authenticated, a second shared secret key PMK "TMK3" is generated. In an example, the second PMK is derived from one or more EAP parameters provided by the authentication server 114 (e.g., as included in the RADIUS access accept message). In an example, the one or more EAP parameters may include EAP keying information such as a master session key, extended master session key and/or an initialization vector. The Wi-Fi extender device 106 may determine the second PMK using one or more received EAP parameters. The same second PMK may be determined, separately, by the end device 102B using one or more EAP parameters received during the progression of the authentication communication flow discussed before (e.g., parameters forwarded from the authentication server 114 or the residential gateway device 110).

A handshake procedure is initiated between the Wi-Fi extender device 106 and the end device 102B to generate a second key PTK "TPKc". More specifically, the authenticated Wi-Fi extender device 106 performs a handshake with the end device 102B to determine the second PTK. As mentioned before, the handshake may be implemented using a four-way handshake technique. Instead of disclosing the second PMK key, the Wi-Fi extender device 106 and the end device 102B can each encrypt respective messages to each other, which can be decrypted using the second PMK. If decryption of the messages is successful (e.g., the decrypted messages match each other), then the handshake procedure between the Wi-Fi extender device 106 and the end device 102B is considered successful. In an example, the encrypted message may include information based on a shared secret master key.

In one or more implementations, the second PTK is then generated by concatenating one or more of the following attributes: second PMK, AP nonce (ANonce), STA nonce (SNonce), AP MAC address, and STA MAC address. Further, the concatenated attributes may then be put through a pseudo random function to generate the second PTK. The generated second PTK, in an example, is utilized to encrypt data traffic from the end device 102B to the Wi-Fi extender device 106 and/or the residential gateway device 110.

Figure 4:
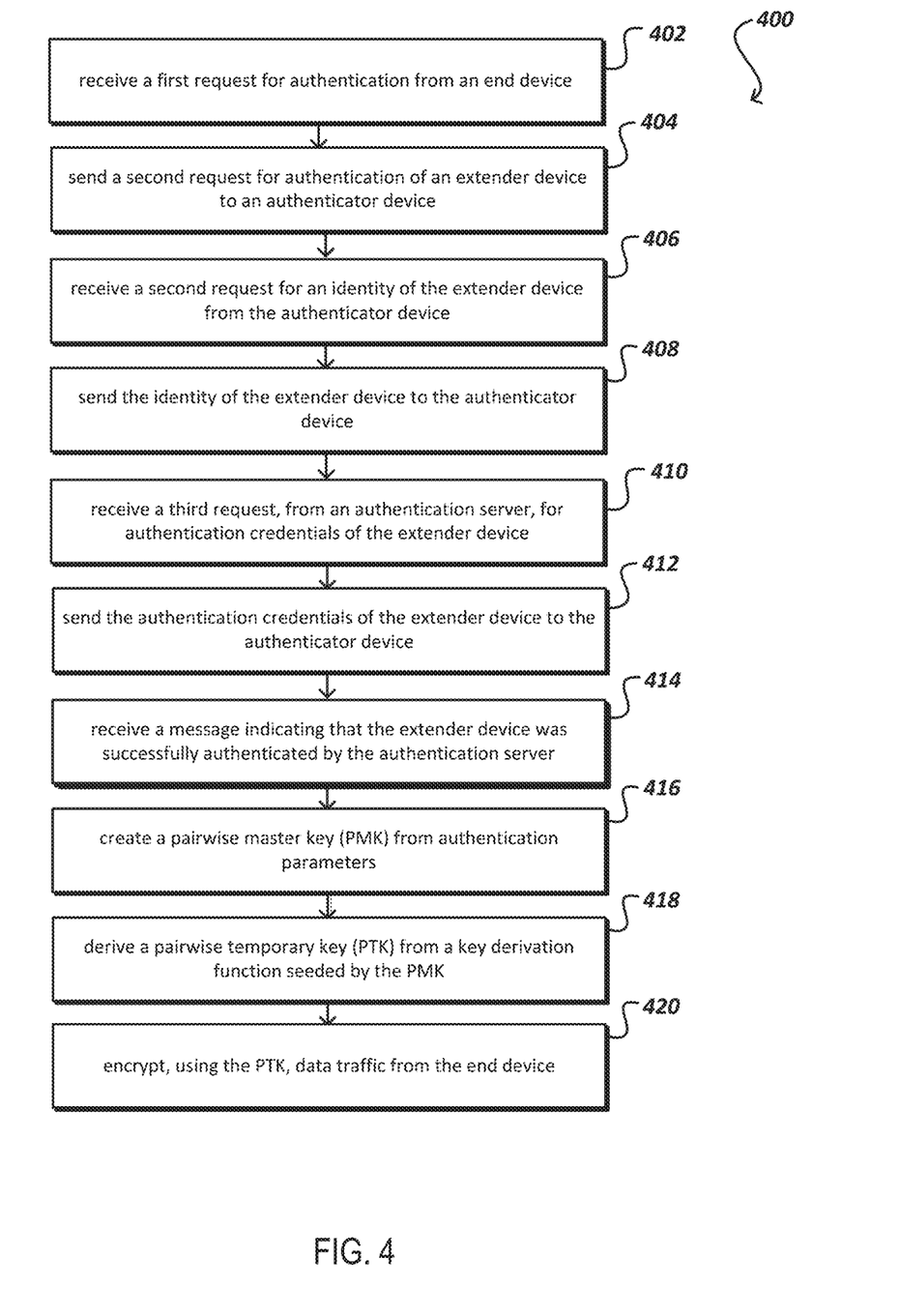
FIG. 4 conceptually illustrates an example flowchart of a process performed by a Wi-Fi extender device for authenticating the Wi-Fi extender device and determining a pairwise temporary key derived from a successful authentication of an end device in accordance with some implementations.

FIG. 4 conceptually illustrates an example flowchart of a process 400 performed by the Wi-Fi extender device 106 for authenticating the Wi-Fi extender device 106 and determining a pairwise temporary key derived from a successful authentication of an end device 102A in accordance with some implementations. The following description of FIG. 4 will refer back to respective devices discussed before by reference to FIG. 1. For example, as mentioned above, the process 400 of FIG. 4 may be performed by the Wi-Fi extender device 106; however, the process 400 is not limited to the Wi-Fi extender device 106 and may be performed by any suitable device. Although this figure, as well as other process illustrations contained in this disclosure may depict functional steps in a particular sequence, the processes are not necessarily limited to the particular order or steps illustrated. The various steps portrayed in this or other figures can be changed, rearranged, performed in parallel or adapted in various ways. Furthermore, it is to be understood that certain steps or sequences of steps can be added to or omitted from the process, without departing from the scope of the various implementations.

A first request for authentication from an end device 102A is received by the Wi-Fi extender device 106 (402). In response to the first request for authentication, a second request for authentication of the Wi-Fi extender device 106 is sent to an authenticator device, such as the residential gateway device 110 (404). A second request for an identity of the Wi-Fi extender device 106 is received from the authenticator device, such as the residential gateway device 110 (406). Responsive to the second request, the Wi-Fi extender device 106 sends its identity to the authenticator device, such as the residential gateway device 110 (408).

A third request, from an authentication server 114, for authentication credentials of the Wi-Fi extender device 106 is received (410). The authentication credentials of the Wi-Fi extender device 106 are sent to the authenticator device, such as the residential gateway device 110 (412). A message indicating that the Wi-Fi extender device 106 was successfully authenticated by the authentication server 114 is received, such as from the authenticator device (414). The message may include one or more authentication parameters. A pairwise master key (PMK) is created from the authentication parameters (416). A pairwise temporary key (PTK) is derived from a key derivation function seeded by the PMK (418). Using the PTK, data traffic from the end device 102A may be encrypted (420) (e.g., for sending to the authenticator device, such as the residential gateway device 110) as part of an authentication protocol for authenticating the end device.

Figure 5:
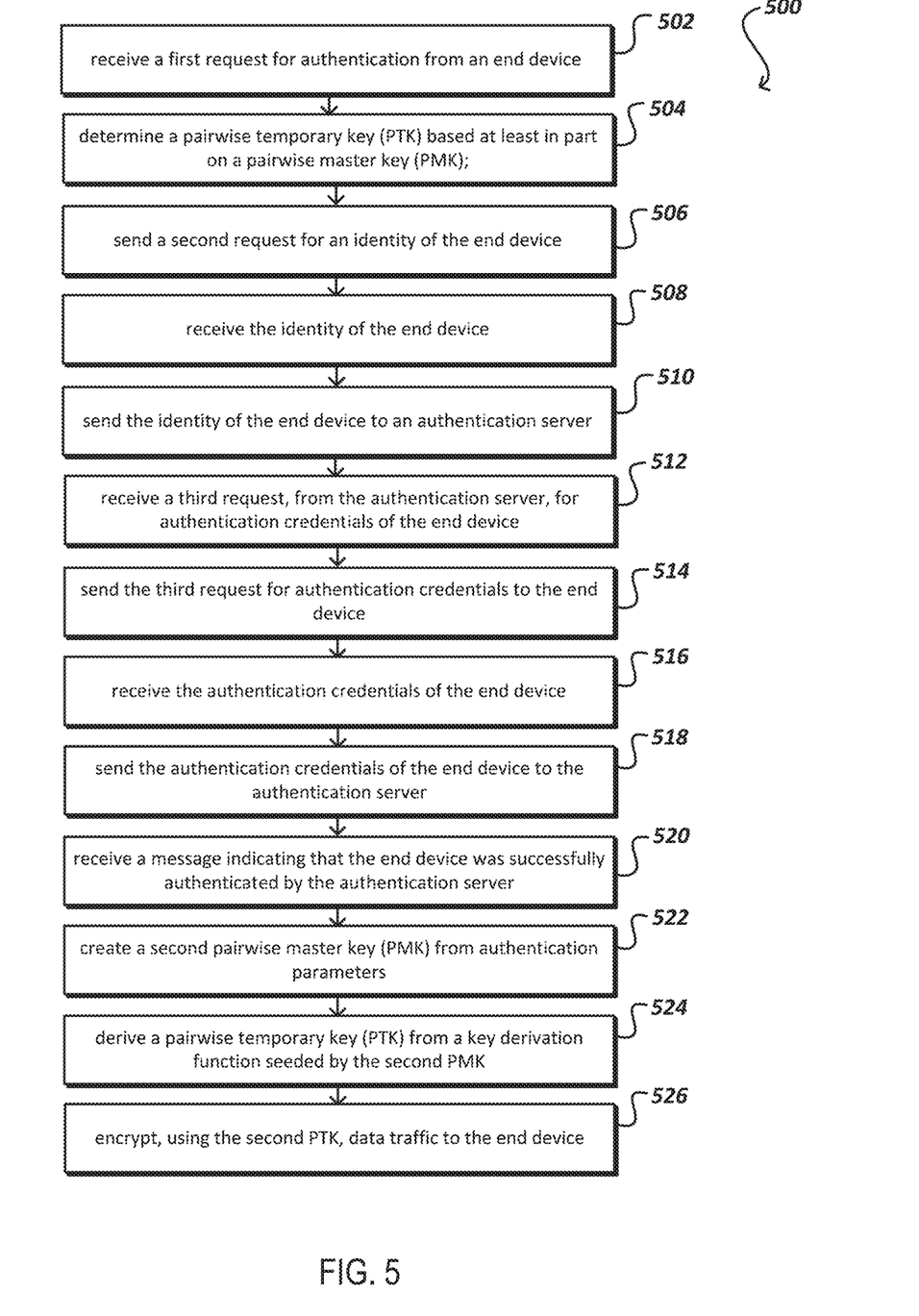
FIG. 5 conceptually illustrates an example flowchart of a process performed by a Wi-Fi extender device for authenticating a new end device and determining a new pairwise temporary key derived from a successful authentication of the new end device in accordance with some implementations.

FIG. 5 conceptually illustrates an example flowchart of a process 500 performed by the Wi-Fi extender device 106 for authenticating a new end device 102A and determining a new pairwise temporary key derived from a successful authentication of the new end device 102A in accordance with some implementations. The following description of FIG. 5 will refer back to respective devices discussed before by reference to FIG. 1. For example, as mentioned above, the process 400 of FIG. 4 may be performed by the Wi-Fi extender device 106; however, the process 400 is not limited to the Wi-Fi extender device 106 and may be performed by any suitable device.

A first request for authentication from an end device 102A is received (502). A pairwise temporary key (PTK) based at least in part on a pairwise master key (PMK) is determined (504). A second request for an identity of the end device 102A is sent to the end device 102A (506). The identity of the end device 102A is received (508) and the identity of the end device 102A is sent to an authentication server (510). A third request, from the authentication server 114, for authentication credentials of the end device 102A is received (512). The third request for authentication credentials is sent to the end device 102A (514).

The authentication credentials of the end device 102A are received (516) and the authentication credentials of the end device 102A are sent to the authentication server 114 (518). A message indicating that the end device 102A was successfully authenticated by the authentication server 114 is received (520). The message may include one or more authentication parameters. A second pairwise master key (PMK) is created from the authentication parameters (522). A second pairwise temporary key (PTK) is derived from a key derivation function seeded by the PMK. Using the second PTK, data traffic to the end device 102A may be encrypted (526).

Figure 6:
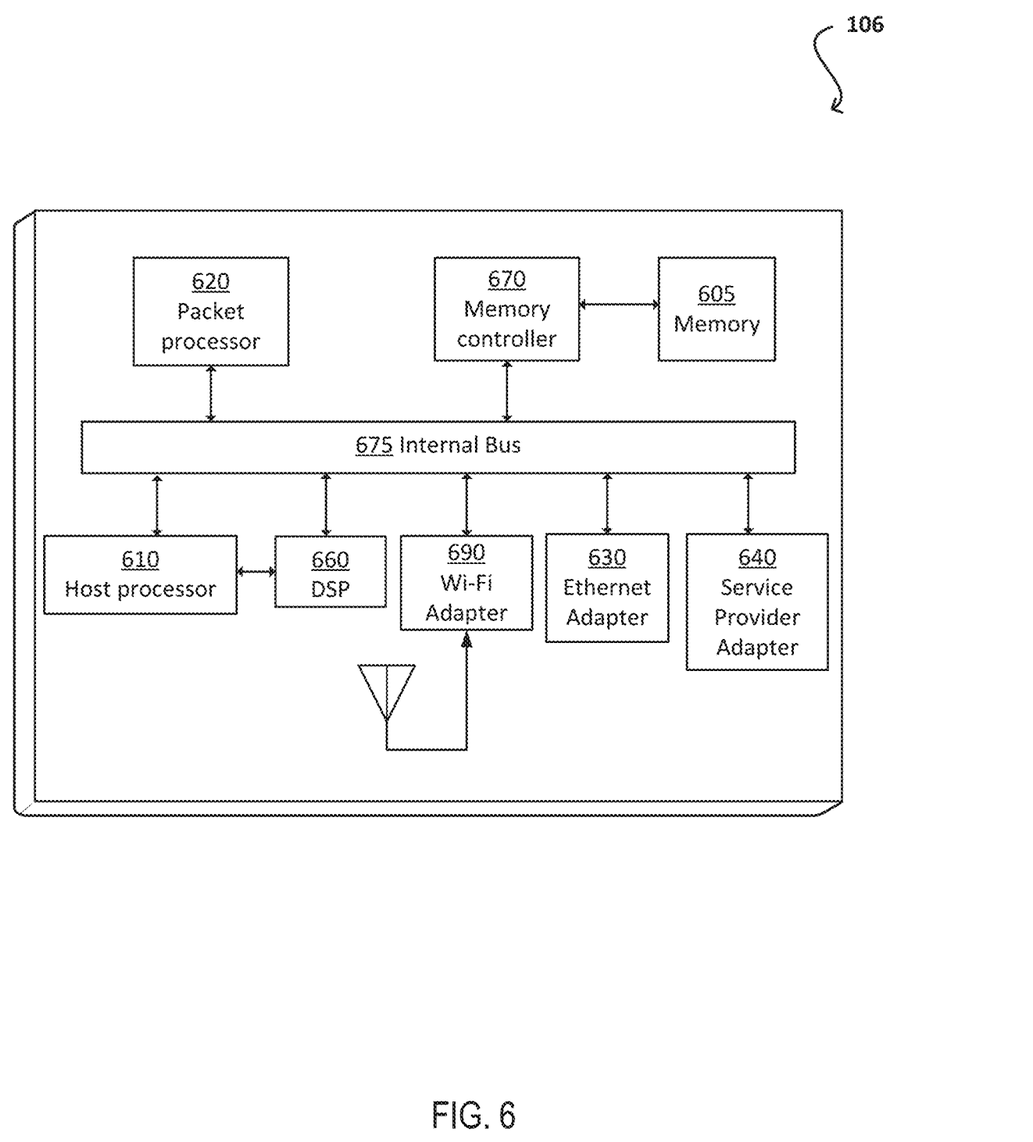
FIG. 6 illustrates an example Wi-Fi extender device in accordance with various implementations. In some implementations, FIG. 6 may also describe various components of residential gateway.

FIG. 6 shows an example Wi-Fi extender device 106 in accordance with various implementations. In some implementations, FIG. 6 may also describe various components of a residential gateway device 110. The Wi-Fi extender device 106 handles traffic flows from subscriber devices. A subscriber device may be, for example, a telephone device, a computer connected to a local area network (LAN), a wireless LAN (WLAN), or a combination thereof, and a set-up box. The Wi-Fi extender device 106 includes a host processor 610, a packet processor 620, an Ethernet adapter 630, a service provider adapter 640, a digital signal processor (DSP) 660, and a memory controller 670 that interacts with a memory 605. The various components of the Wi-Fi extender device 106 communicate through an internal bus 675.

The Wi-Fi extender device 106 further includes a wireless (Wi-Fi) adapter 690. The Wi-Fi adapter 690 enables communication via a WLAN in an example. The Wi-Fi adapter 690 provides the MAC and physical (PHY) connectivity layers for a wireless network using a radio including radio frequency (RF) circuitry and an antenna. For example, the radio of the Wi-Fi adapter 690 provides digital-to-analog conversion, modulation and transmission for wireless transmission of signals to a mobile station or end device (STA) (e.g., mobile phone, audio/video player, tablet computer, etc.). The radio of the Wi-Fi adapter 690 also provides reception, detection, analog-to-digital conversion and baseband processing of signals received from a STA. Accordingly, the radio of the Wi-Fi adapter 690 includes one or more transceivers (transmitter and receiver) to perform these functions. The radio of the Wi-Fi adapter 690 is coupled to one or more antenna(s) for transmission and/or reception. The radio of the Wi-Fi adapter 690 may have capabilities for performing multiple-input, multiple-output (MIMO) operations using a plurality of antennas. Furthermore, the radio of the Wi-Fi adapter 690 may employ omni-directional antennas, such as for 2.4 GHz to 5 GHz operations. Alternatively, the radio of the Wi-Fi adapter 690 may employ directional antennas, such as for 60 GHz operations. The Wi-Fi adapter 690 is compatible with any of the IEEE 802.11x communication standards.

The packet processor 620 performs tasks including, for example, bridging, IP routing, Network address translation, queuing and shaping of packets. Data processed by the packet processor 620 may be either an upstream flow (e.g., data sent from a subscriber device connected to the Wi-Fi extender device 106), or a downstream flow (e.g., data sent from another network entity or device to a subscriber device). The packet processor 620 is a dedicated piece of hardware designed to accelerate the processing of packets belonging to a certain flow. In certain implementations, the packet processor 620 is programmable using firmware, which comprises low-level execution code (e.g., assembly or any proprietary programming language).

The host processor 610 executes tasks that are typically related to management of connections handled by the Wi-Fi extender device 106. For example, such tasks include, but are not limited to, opening/closing connections, controlling the state of a connection, identifying traffic received on a new connection, and so on. Such operations generally do not require processing of individual packets belonging to a certain flow. For example, if the host processor 610 identifies a packet received on a new connection, then the processing of the first packet will be performed by the host processor 610 and subsequent packets are handled only by the packet processor 620. The host processor 610 is typically a general-purpose central processing unit (CPU) that is programmable to execute software that includes high-level programming language over an operation system. In certain implementations, the host processor 610 may be a high-performance CPU including an instruction cache and a data cache, or a multi-core processor including multiple cores, shared memory, and/or one or more caches.

The Ethernet adapter 630 includes a plurality of Ethernet interfaces for interfacing with a plurality of subscriber devices. These interfaces may be, but are not limited to, 500 Mbit Ethernet, 5 Gigabit Ethernet, 50 Gigabit Ethernet, 100 Gigabit Ethernet, Terabit Ethernet, etc. The Ethernet adapter 630 is capable of receiving an upstream data flow from subscriber devices and transmitting downstream data to subscriber devices. The service provider adapter 640 processes traffic in accordance with various modes. The service provider adapter 640 provides an interface coupling to one or more service providers of sources of data such as multimedia data and/or streaming video from a service provider. For example, a service provider may be a cable television provider, a satellite provider, an independent service provider (ISP) for Internet connections, an on-demand service provider, a broadcast provider, etc., or a combination thereof. The service provider adapter 640 handles received downstream data flows and transmits upstream data flows. Either upstream or downstream data flows are respectively forwarded to, or received from, the packet processor 620 via the internal bus 675.

The DSP 660 is the handler of voice services and provides an interface to a telephone device connected to the Wi-Fi extender device 106. The DSP 660 is adapted to receive and send voice samples from and to the telephone devices. Specifically, analog voice signals received from a telephone device are sampled by the DSP 660 and saved in the memory 605. These samples are further processed by the host processor 610, which generates IP packets to include the voice data. Similarly, the host processor 610 processes input IP packets including voice data and stores the processed packets in the memory 605. The DSP 660 retrieves the data packets from the memory and generates voice signals which are sent to the telephone device.

In accordance with some implementations, the processing of a Wi-Fi packet is separated between the host processor 610 and the packet processor 620. Such an approach may reduce the utilization of the host processor 610, thereby increasing the performance of the Wi-Fi extender device 106. In at least one implementation, the packet processor 620 is programmed with instructions purposely designed to accelerate the processing of all networking tasks of the Wi-Fi stack. The host processor 610 using its operating system performs all other tasks of the Wi-Fi stack in at least one implementation.

Figure 7:
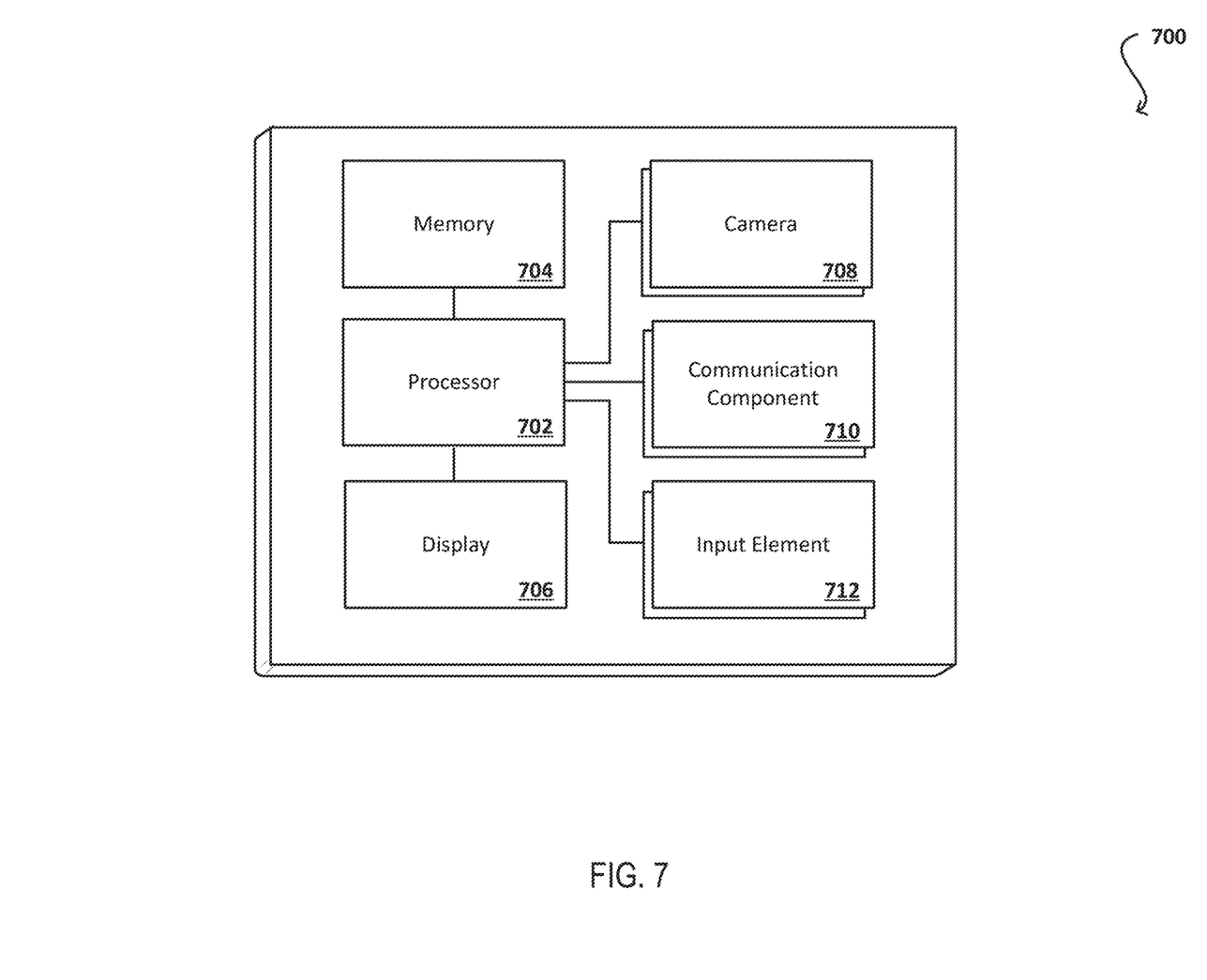
FIG. 7 illustrates an electronic system with which aspects of the subject technology may be implemented in accordance with one or more implementations.

FIG. 7 illustrates a logical arrangement of a set of general components of an example computing device 700 such as the end device 102A or end device 102B described in reference to FIG. 2 and/or FIG. 3. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers.

As discussed, the device in many implementations will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 712, such as a mono or stereo microphone or microphone array, operable to capture audio information from at least one primary direction. A microphone can be a uni- or omni-directional microphone as known for such devices.

In some implementations, the computing device 700 of FIG. 7 can include one or more communication elements (not shown), such as a Wi-Fi, Bluetooth, RF, wired, or wireless communication system. The device in many implementations can communicate with a network, such as the Internet, and may be able to communicate with other such devices. In some implementations the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some implementations, however, such a device might not include any buttons at all, and might be controlled only through a combination of visual and audio commands, such that a user can control the device without having to be in contact with the device.

The computing device 700 also can include at least one orientation or motion sensor 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semi conductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item), The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
      in response to receipt of a first request for authentication from an end device different than the device, perform, by the device, an authentication protocol to authenticate the device as a proxy authenticator with an authentication server via an authenticator device, wherein the authentication protocol causes the at least one processor to:
         transmit, by the device in response to receipt of the first request, a second request for authentication to the authenticator device to initiate the authentication protocol with the authentication server, wherein the second request comprises a request for authenticating the device with the authentication server; and
      when the authentication protocol is successfully performed:
         receive, from the authenticator device, a message indicating that the device was successfully authenticated by the authentication server, the message including one or more parameters;
         determine a pairwise master key (PMK) based at least in part on the one or more parameters;
         determine a pairwise temporary key (PTK) based at least in part on the PMK;
         encrypt, using the PTK, a message from the end device; and
         transmit the message to the authenticator device to separately authenticate the end device with the authentication server.

2. The device of claim 1, wherein the authentication protocol further causes the at least one processor to:
   receive, from the authenticator device, a request for an identity of the device;
   transmit the identity of the device to the authenticator device;
   receive, from the authentication server, a request for authentication credentials of the device; and
   transmit the authentication credentials of the device to the authenticator device.

3. The device of claim 2, wherein the authentication credentials are based on a shared secret master key.

4. The device of claim 2, wherein the authentication server comprises a Remote Authentication Dial-In User Service (RADIUS) server.

5. The device of claim 1, wherein the authentication is based on an Extensible Authentication Protocol (EAP) and the first request for authentication comprises a EAP start message.

6. The device of claim 1, wherein the processor is further configured to:
   receive a message indicating that the end device was successfully authenticated, the message including keying information;
   determine a second pairwise master key (PMK) based at least in part on the keying information; and
   determine a second pairwise temporary key (PTK) based at least in part on the second PMK.

7. The device of claim 6, wherein the keying information includes second one or more EAP parameters received from the authentication server.

8. The device of claim 6, wherein the second PTK is used to encrypt data traffic to the end device.

9. The device of claim 1, wherein the authenticator device comprises a residential gateway device that is configured to provide access to a community wireless network via the device.

10. The device of claim 1, wherein the PMK is shared between the authenticator device and the device as part of a handshake procedure to determine the PTK and the message is to be sent to the authenticator device for authenticating the end device.

11. The device of claim 1, wherein the end device comprises a first supplicant device with respect to the authentication server and the device comprises a second supplicant device with respect to the authentication server.

12. The device of claim 1, wherein the at least one processor is further configured to:
   authenticate, using at least the PTK, the end device as another proxy authenticator for the authentication server.

13. The device of claim 1, wherein the one or more parameters include keying information used to determine the PMK.

14. The device of claim 1, wherein the PTK is further determined based on a pseudo random function.

15. The device of claim 1, wherein the PTK is further determined based on a handshake procedure between the device and the end device, the handshake procedure including decrypting, using the PMK, an encrypted message from the end device.

16. A method comprising:
   in response to receipt, at a device, of a first request for authentication from an end device different than the device, performing an authentication protocol to authenticate the device with an authentication server via an authenticator device, wherein performing the authentication protocol comprises:
      transmitting, by the device in response to receipt of the first request, a second request for authentication to the authenticator device to initiate the authentication protocol with the authentication server, wherein the second request comprises a request for authenticating the device with the authentication server; and
   when the authentication protocol is successfully performed:
      receiving, from the authenticator device, a message indicating that the device was successfully authenticated by the authentication server, the message including one or more parameters;
      determining a first key based at least in part on the one or more parameters;
      determining a second key based at least in part on the first key;
      encrypting, using the second key, a message from the end device; and
      transmitting the encrypted message to the authenticator device for authenticating the end device with the authentication server, wherein the end device comprises a first supplicant device with respect to the authentication server and the device comprises a second supplicant device with respect to the authentication server.

17. The method of claim 16, wherein the authentication protocol further comprises:
   receiving, from the authenticator device, a request for an identity of the device;
   transmitting the identity of the device to the authenticator device;

receiving, from the authentication server, a request for authentication credentials of the device; and transmitting the authentication credentials of the device to the authenticator device.

18. The method of claim 16, further comprising:

receiving a message indicating that the end device was successfully authenticated, the message including keying information;

determining a third key based at least in part on the keying information; and determining a fourth key based at least in part on the third key.

19. A system comprising:

an authenticator device;

an authentication server; and an extender device configured to:
 in response to receipt of a first request for authentication from an end device, perform an authentication protocol to authenticate the extender device with an authentication server via an authenticator device, wherein the authentication protocol causes the extender device to:
  transmit, by the extender device in response to receipt of the first request, a second request for authentication to the authenticator device to initiate the authentication protocol with the authentication server, wherein the second request comprises a request for authenticating the extender device with the authentication server; and
 when the authentication protocol is successfully performed:
  receive, from the authenticator device, a message indicating that the extender device was successfully authenticated by the authentication server, the message including one or more parameters;
  determine a pairwise master key (PMK) based at least in part on the one or more parameters;
  determine a pairwise temporary key (PTK) based at least in part on the PMK; and
  encrypt, using the PTK, a message from the end device for secure transmission to the authenticator device for separately authenticating the end device with the authentication server based on the authentication protocol.

20. The system of claim 19, wherein the authentication protocol further causes the extender device:

receive, from the authenticator device, a request for an identity of the extender device;

transmit the identity of the extender device to the authenticator device;

receive, from the authentication server, a request for authentication credentials of the extender device; and transmit the authentication credentials of the extender device to the authenticator device.

* * * * *